United States Patent [19]

Margraf

[11] 4,353,720
[45] Oct. 12, 1982

[54] CONTACT COMPARTMENT FOR REMOVING NOXIOUS GASEOUS COMPONENTS FROM A GAS STREAM

[76] Inventor: Adolf Margraf, Am Schleplingsbach 46, 3060 Stadthagen, Fed. Rep. of Germany

[21] Appl. No.: 222,976

[22] Filed: Jan. 7, 1981

[30] Foreign Application Priority Data

Jan. 17, 1980 [DE] Fed. Rep. of Germany ....... 3001525

[51] Int. Cl.³ ...................... B01D 53/14; B01D 50/00
[52] U.S. Cl. ....................................... 55/262; 55/317; 55/323; 55/337; 55/338; 55/390; 55/403; 55/474; 55/316; 422/171; 422/191; 422/210; 422/234
[58] Field of Search ................. 55/262, 317, 321, 323, 55/337, 338, 390, 403, 474, 515, 316; 422/171, 191, 209-211, 234

[56] References Cited

U.S. PATENT DOCUMENTS

| | | | |
|---|---|---|---|
| 2,230,166 | 1/1941 | Skanes | 422/210 |
| 2,980,515 | 4/1961 | Horner et al. | 422/211 |
| 3,312,530 | 4/1967 | Sackett | 422/210 |
| 4,140,502 | 2/1979 | Margraf | 55/341 H |
| 4,156,599 | 5/1979 | Margraf | 55/262 |

FOREIGN PATENT DOCUMENTS

| | | | |
|---|---|---|---|
| 548952 | 11/1957 | Canada | 55/262 |
| 2153777 | 3/1973 | Fed. Rep. of Germany | 55/262 |

Primary Examiner—David L. Lacey
Attorney, Agent, or Firm—Balogh, Osann, Kramer, Dvorak, Genova & Traub

[57] ABSTRACT

A contact compartment for intermixing dust or fume laden gases with solid substances, in a turbulent or fluidized layer, the gases being the turbulence carrier, and the solid substances being the turbulence material. The intermixing action induces the noxious components of the dust or fume laden gases to absorptively react or combine with the solid substances and form absorption compounds. In order to prevent the conventional formation of inhomogeneous sections in the turbulent or fluidized layer, during the intermixing action, the turbulence material and turbulence carrier, present in the compartment, flow transversely through at least one revolving drum having a perforated peripheral wall and equipped with a charge of filled-in regular or irregular-shaped bodies.

6 Claims, 1 Drawing Figure

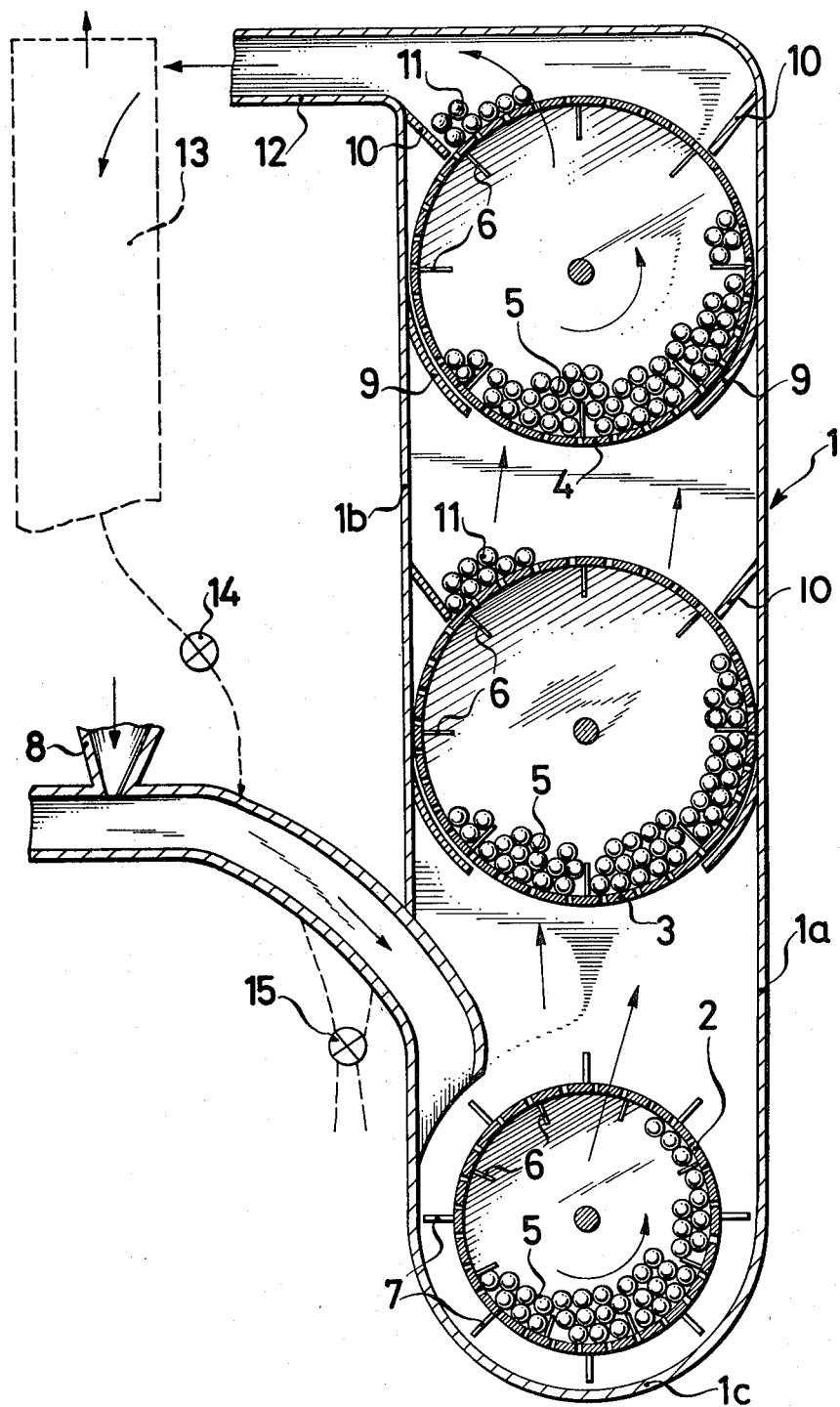

CONTACT COMPARTMENT FOR REMOVING NOXIOUS GASEOUS COMPONENTS FROM A GAS STREAM

BACKGROUND OF THE INVENTION

The present invention relates generally to devices for exchange of materials, and in particular to a materials contact compartment of the kind including a turbulent or fluidized bed or layer.

It is well known that, in order to induce chemical reactions or absorption bonding between a solid substance and a gas containing noxious components, the solid substance be placed in the fluidized state by means of the gas containing noxious components. By intermixing the solid substance and the gas in a turbulent manner, the former combines or forms absorptive bonds (absorption compounds) with the noxious gas components.

In practice, however, it was discovered that such turbulent intermixing of a solid substance acting as a turbulence material and a gas acting as a turbulence agent or carrier, does not always form a homogeneous fluidized or turbulent bed. A conventional fluidized bed may have vertical passages, rising gas bubbles, or gas layers devoided of turbulence material. Such effects are highly undesirable. It results, for example, in a substantial portion of the noxious gas components not combining or chemically reacting with the solid substance, and the latter not being utilized as a turbulence material or only partially or inadequately so. It is also apparent that, since the solid substance particles vary considerably in grain size, it is primarily and practically only the smaller particles (having a relatively large surface as compared to their weight) which react or combine with the noxious gas components.

It is an object of the invention to minimize or prevent gas passages, gas bubbles or gas layers, from being formed without admixture of turbulence material in a fluidized or turbulent layer of an upright fluid bed compartment, and to utilize the turbulence material to the optimum degree notwithstanding different particle sizes.

SUMMARY OF THE INVENTION

To fulfill this and other objects in a device of the kind hereinabove referred to, an upright fluid bed compartment of rectangular cross-section having a lower and upper portion, into which lower portion the turbulence carrier and the turbulence material are fed and from which top portion the carrier and turbulence material are drawn off contains at least one sieve drum which occupies the cross-section, revolves and is charged with regular (e.g., spheroids), or irregular objects.

The volume of the fluid bed compartment or chamber is thus interrupted at least once by one sieve drum but advantageously several or many times by sieve drums so that the forming of gas passages, gas bubbles or the like without admixture of turbulence material is prevented in the turbulence or fluid bed chamber. This causes immediate mixing of turbulence material and turbulence carrier in the turbulence chamber and thereafter repeated mixing of the same in each subsequent spheroid charged revolving drum or rotor, and an homogenous fluidized bed which promotes the collision of solid particles and noxious gases is subsequently produced by means of fluidized displaced turbulence material particles above the lowest sieve drum or above every sieve drum as the case may be. The solid material particles are broken up increasingly from sieve drum to sieve drum, so that new surfaces of the solid particles are produced after each sieve drum for reaction with the noxious gases. It is thus possible to utilize to the optimum degree the solid particles or additives, which are to be added, for the chemical reaction.

The absorption compounds produced may also be partially separated from the gas flow outside the fluid bed compartment and fed into the compartment again together with fresh solid particles, if the compounds separated were still to contain solid particles which had not as yet formed any compound with the noxious gases.

BRIEF DESCRIPTION OF THE DRAWING

In order for the invention to be clearer and better understood, reference will now be made to the accompanying single FIGURE of the drawings, which illustrates one embodiment of a fluid bed compartment in vertical diagrammatical cross-section and by way of example only.

DETAILED DESCRIPTION OF PREFERRED EMBODIMENT

Referring now to the drawing, the fluid bed compartment, in accordance with the invention comprises an upright casing 1 of rectangular horizontal cross-section, within which spaced-apart sieve drums 2, 3, 4 are caused to revolve, matching the horizontal cross-section of the compartment 1 and the periphery of which has the casing sides or side walls 1a, 1b, tangent to it. The drums are journalled horizontally. The casing 1 is provided with an inlet opening at the lower portion thereof and an outlet opening at the top portion thereof.

These sieve drums 2, 3, 4 are partially filled with heavy spheroids 5 or other heavy objects which may be of regular or irregular shape, and are entrained by the rotation of the drums and then drop down again in the drum. In order that a useful entrainment of these objects 5 occurs, the internal surface of the peripheral side of the drum may be provided with axially parallel entraining bars 6.

The diameter of the lowest sieve drum 2 is a little smaller than that of the upper sieve drums 3, 4 which may, if desired, be increased in number, and this lower drum 2 is provided on its external periphery with axially parallel scraper bars 7 which sweep over and scrape the cylindrical compartment base 1c and thereby prevent accumulation of material below the drum 2.

The turbulence material and the turbulence carrier, in particular a gas originating from optional combustion plants or the like and in particular containing solids or additives and a noxious gas, are fed to the sieve drum 2, via the inlet opening and the cylindrical compartment base 1c, in the lower section of the fluid bed compartment, so that the turbulence material drawn from a store 8 and the turbulence carrier come into contact in the sieve drum 2. The turbulence material, in the form of solids or additives is such as to react with molecules of noxious gases, such as $HCl$, $H_2F_2$, $SO_3$, $SO_2$, or the like of the turbulence carrier to form and produce absorption compounds which are subsequently separated in conventional manner from the fluid layer carrier, that is from the gas flow.

Direct contact between the gas and the solids is already obtained in the drum 2 by means of the moving or rolling spheroids or tumbling objects co-operating with the solids or additives fed into it, whereupon a turbulent fluidized layer consisting of gas and solids is then formed above the lowest sieve drum 2 in which solid-free gas passages, gas bubbles or the like cannot occur because the turbulent layer is interrupted by the next sieve drum 3 which is again traversed by flow from the bottom towards the top insert portion and outlet opening of the casing, by-passing of the drum 3 being prevented by the fact that it is partially screened along the lower periphery by flanking surfaces 9 projecting from the tangential contact surfaces 1a and 1b, which are also incorporated for the topmost drum 4. Scrapers 10 projecting from the surfaces 1a and 1b and which prevent spheroids 11 or the like which lie loose on the sieve drums 3 and 4 from being jammed between the drum and the wall, are situated at the upper side of each upper drum 3, 4. These spheroids 11 serve the purpose of keeping the perforations of the sieve drums 3 and 4 clear and free of solid particles. As will be understood, a free turbulence or fluid layer is again formed above the drum 3, in which the noxious gases in turbulent motion come into contact with the solid substances and undergo reactions, just as inside the sieve drums themselves, in which connection it is pertinent to point out that the solids undergo continuing break-up or grinding in the drum 3 by the action of the continuously rotarily entrained and dropping objects 5, so that new surfaces of the solids are available to the noxious gases for absorption compound forming.

The number of sieve drums may be increased if desired. The solids or additives which are to be added may on the whole be largely used up.

The gas containing a combination of noxious gases and solid particles or additives, in compound form as well as unused particles or additives and flowing out from the casing 1 at the top portion thereof via the outlet opening and the pipe 12, may for example be ducted to a separator 13, from which the compounds and additives are separated and are fed to the gas duct together with fresh additives via a bucket wheel 14, a proportion of the solids and compounds being withdrawable from the gas duct, e.g. at 15. The additives not used at that time may then be brought again into direct contact with the noxious components of a gas in the vortexial layer compartment 1, so that an extensive utilization of the additives may also be assured in a case of this kind. It should be noted, however, that this procedure may not be applicable in certain exceptional cases.

I claim:

1. In a contact compartment having an upright fluid-bed chamber provided with an inlet opening at the lower portion thereof and an outlet opening at the top portion thereof and in which a turbulence material comprising solid substances adapted to form absorptive bonds with noxious gaseous components, and a turbulence carrier comprising gases having noxious components, are intermixed in a turbulent whirling manner to form absorption compounds therefrom, said turbulence solid substances and gases being fed via the inlet opening into the lower portion of said chamber for upward flow to the top portion and outlet opening of said chamber, the improvement which comprises said upright fluid-bed chamber comprising a rectangular cross-section, means for intermixing said turbulence solid substances and gases and forming absorptive bonds therebetween, which means is disposed at the lower portion of said chamber for contacting said turbulence solid substances and gases fed via the inlet opening into said chamber, at least one rotating sieve drum provided internally with axially parallel peripherally distributed entraining bars and which is positioned in said chamber above said intermixing means, and a plurality of loose spheriod-shaped bodies movably disposed inside said at least one drum, so as to interrupt the upward flow of said intermixed and absorptively bonded solid substances and gases toward the outlet opening of said chamber, and to form a homogeneous turbulent layer thereof.

2. The contact compartment according to claim 1, further comprising said chamber being provided at the lower portion thereof with a cylindrical base into which are fed said turbulence solid substances and gases, via the inlet opening, said intermixing means comprise a first rotating sieve drum being disposed in said cylindrical base for contacting said solid substances and gases, a plurality of loose spheroid-shaped bodies, movably disposed inside said first rotating sieve drum for contacting and intermixing said solid substances and gases, and said at least one rotating sieve drum comprises at least a second rotating sieve drum being disposed in said chamber above said first sieve drum, with a predetermined vertical spacing separating between said first sieve drum and said at least second sieve drum, said at least second rotating sieve drum containing said plurality of loose spheriod-shaped bodies movably disposed therein, and being provided internally with said axially parallel peripherally distributed entraining bars, so as to actively interrupt the upward flow of said intermixed and absorptively bonded solid substances and gases toward the outlet opening of said chamber, and to form a homogeneous turbulent layer above said first sieve drum.

3. The contact compartment according to claim 2, wherein said first rotating sieve drum is provided internally with axially parallel peripherally distributed entraining bars for entraining said spherical-shaped bodies and providing increased intermixing of said solid substances and gases.

4. The contact compartment according to claim 2, wherein said first sieve drum is provided on its external peripheral surface with axially parallel scraper bars arranged to sweep over and scrape said cylindrical base.

5. The contact compartment according to claim 2, wherein said chamber is provided with side walls tangential to said at least second sieve drum, and a plurality of loose spheriod-shaped heavy bodies lie on the upper peripheral surface of said at least second sieve drum, and scraper bars are attached to said tangential side walls of said chamber, said scraper bars projecting downwardly and inwardly towards the periphery of said at least second sieve drum.

6. The contact compartment according to claim 2, further comprising a separator device and conduit means for connecting the outlet and inlet openings of said chamber respectively to said separator device, said device having means to separate solid particles of said absorption compounds from the gas flowing outwardly of said chamber, and at least partially resupply and feed the same again via said inlet opening to said first rotating sieve drum together with fresh solid substances.

* * * * *